US011900507B2

(12) United States Patent
Vlot et al.

(10) Patent No.: US 11,900,507 B2
(45) Date of Patent: Feb. 13, 2024

(54) VISUALIZING WOOD STAINING

(71) Applicant: Akzo Nobel Coatings International B.V., Amsterdam (NL)

(72) Inventors: Margot Julia Vlot, Leiden (NL); Peter Mark Spiers, Uxbridge (GB); Eric Jacob Jan Kirchner, Leiden (NL)

(73) Assignee: Akzo Nobel Coatings International B.V., Amsterdam (NL)

( * ) Notice: Subject to any disclaimer, the term of this patent is extended or adjusted under 35 U.S.C. 154(b) by 0 days.

(21) Appl. No.: 17/619,057

(22) PCT Filed: Jun. 29, 2020

(86) PCT No.: PCT/EP2020/068237
§ 371 (c)(1),
(2) Date: Dec. 14, 2021

(87) PCT Pub. No.: WO2021/001310
PCT Pub. Date: Jan. 7, 2021

(65) Prior Publication Data
US 2022/0301238 A1 Sep. 22, 2022

(30) Foreign Application Priority Data

Jul. 2, 2019 (EP) ..................................... 19183999

(51) Int. Cl.
*G06T 11/00* (2006.01)
*G06T 7/10* (2017.01)
(Continued)

(52) U.S. Cl.
CPC ........ *G06T 11/001* (2013.01); *G06F 3/04845* (2013.01); *G06T 7/10* (2017.01);
(Continued)

(58) Field of Classification Search
CPC ..... G06T 7/90; G06T 7/11; G06T 7/10; G06T 11/001; G06T 2207/10024;
(Continued)

(56) References Cited

U.S. PATENT DOCUMENTS

| 7,430,316 B2 | 9/2008 | Boston et al. |
| 7,764,831 B1 * | 7/2010 | Pick .......................... G01J 3/46 |
| | | 382/162 |

(Continued)

FOREIGN PATENT DOCUMENTS

| AU | 2010210344 A1 * | 8/2011 | .......... B01F 13/1055 |
| CN | 204479931 U | 7/2015 | |

(Continued)

OTHER PUBLICATIONS

Abstract of CN10582972A.
(Continued)

*Primary Examiner* — Wesner Sajous
(74) *Attorney, Agent, or Firm* — Pauly, DeVries Smith & Deffner LLC

(57) ABSTRACT

A computer implemented method and system for generating a visualization of a stained wood substrate are provided. The method includes receiving an image of the wood substrate to be stained; subdividing the image i-14 into a plurality of sub-images, each sub-image corresponding to the portion of the image having a color falling in a respective one of color bands; for each sub-image, retrieving a reflectance curve representative for the wood substrate for the color corresponding to the sub-image; retrieving absorption and scattering values for the stain; for each sub-image, determining the reflectance curve representative for the stained wood based on the absorption and scattering values for the stain and the reflectance curve for the wood substrate for that sub-image; and for each pixel of each sub-image, determin-
(Continued)

ing a color based on the reflectance curve representative for the stained wood, resulting in a generated image of the substrate after applying the stain.

17 Claims, 6 Drawing Sheets

(51) Int. Cl.

| | | |
|---|---|---|
| *G06T 7/90* | (2017.01) | |
| *G01J 3/46* | (2006.01) | |
| *H04N 1/60* | (2006.01) | |
| *H04N 5/57* | (2006.01) | |
| *H04N 9/64* | (2023.01) | |
| *G06F 3/048* | (2013.01) | |
| *G09G 5/02* | (2006.01) | |
| *G09G 5/06* | (2006.01) | |
| *G06F 3/04845* | (2022.01) | |

(52) U.S. Cl.
CPC ............ *G06T 7/90* (2017.01); *G06T 2200/24* (2013.01); *G06T 2207/10024* (2013.01); *G06T 2207/20021* (2013.01); *G06T 2210/32* (2013.01)

(58) Field of Classification Search
CPC ....... G06T 2207/20021; G06T 2200/24; G06T 2210/32; G06F 3/04845; G06F 3/0482; G06F 3/0484; G06F 3/04842; G06F 3/04847; C09D 15/00; C09D 7/41; C09D 5/004; G09G 5/02; G09G 5/024; G09G 5/026; G09G 5/04; G09G 5/06; G09G 5/10; G09G 5/30; G09G 5/377; G09G 2320/02; G09G 2320/04; G09G 2320/06; G09G 2320/066; G09G 2320/0666; G09G 2320/0673; G09G 2320/062; G09G 2320/0653; G09G 2320/0686; H04N 1/60; H04N 1/6025; H04N 1/6027; H04N 1/6075; H04N 5/57; H04N 5/58; H04N 9/64; H04N 9/68; H04N 9/77; G06V 10/00; G06V 10/20; G06V 10/22; G06V 10/235; G06V 10/25–26; G06V 10/28–30; G06V 10/40; G06V 10/42; G06V 10/443; G06V 10/462–50; G06V 10/54; G06V 10/58; G06V 10/757; G06V 10/98
See application file for complete search history.

(56) References Cited

U.S. PATENT DOCUMENTS

| | | | |
|---|---|---|---|
| 2004/0093112 A1 | 5/2004 | Marchand et al. | |
| 2004/0131756 A1* | 7/2004 | Skierski | G01J 3/465 |
| | | | 427/256 |
| 2006/0210153 A1* | 9/2006 | Sara | G01J 3/46 |
| | | | 382/165 |
| 2008/0015791 A1 | 1/2008 | Brini et al. | |
| 2009/0248338 A1 | 10/2009 | Martin | |
| 2012/0067503 A1 | 3/2012 | Davis et al. | |
| 2022/0243069 A1* | 8/2022 | Fishel | C09D 135/02 |

FOREIGN PATENT DOCUMENTS

| | | |
|---|---|---|
| CN | 105629724 A | 6/2016 |
| CN | 106844764 A | 6/2017 |
| EP | 1859241 B1 | 1/2015 |
| ES | 2328770 A1 | 10/1999 |
| JP | H11269411 A | 10/1999 |
| WO | WO2004/090488 A1 | 10/2004 |
| WO | WO2006/102145 A1 | 3/2007 |
| WO | WO2007/033186 | 3/2007 |

OTHER PUBLICATIONS

English Translation of CN106844764A.
Abstract of CN204479931.
English Translation of ES2328770.
Abstract of JPH11269411A.
D.R. Duncan, "The Colour of Pigment Mixtures," Proceedings of the Physical Society, vol. 52, No. 3, 1940, pp. 1-4.
Kubelka, et al., "An Article of Optics of Paint Layers," Aug. 1931, No. 11a, pp. 593-601.
English Translation of Kubelka, et al., "An Article of Optics of Paint Layers," Aug. 1931, No. 11a, pp. 1-16.
International Search Report and Written Opinion of Corresponding Application No. PCT/EP2020/068237, dated Jul. 31, 2020.
European Search Report of Corresponding Application No. EP 19183999.2, dated Oct. 31, 2019.
"Office Action," for Russian Patent Application No. 2022101610 dated Oct. 31, 2023 (12 pages) with English translation.

* cited by examiner

VISUALIZING WOOD STAINING

CROSS-REFERENCE TO RELATED APPLICATIONS

This application is a 35 U.S.C. § 371 national phase application of PCT Application No. PCT/EP2020/068237 (WO 2021/001310 A1), filed on Jun. 29, 2020, which claims the benefit of priority to EP Application No. 19183999.2, filed on Jul. 2, 2019, each of which is incorporated herein by reference in its entirety.

FIELD OF THE INVENTION

The present invention relates to a computer implemented method for generating a visualization of a stained wood substrate.

BACKGROUND TO THE INVENTION

Stains are transparent or semitransparent solutions or suspensions of coloring agents (such as, for example, dyes or pigments and the like) in a vehicle, and typically are designed to color a surface without hiding it. As a result, the stained substrate (typically a species of wood) is colored, but the grain pattern is generally not hidden. Such non-hiding, (semi-)transparent stains are often applied to wood substrates for decorative effect, matching of the color of the wood to another object, or the like. However, selecting a stain to be applied to a particular wood substrate for achieving a desired color outcome is not an easy task. The actual resulting color of the stained wood will depend on properties of the wood substrate as well as properties of the stain. Also a number of layers of stain applied may affect the result. Instead of using only a single stain layer on the wood substrate, in other applications a number of differently composed stain layers are applied on the wood, in a predetermined order. There has long been a desire to accurately predict the resulting color of applying one or multiple stain layers to a wood substrate.

It is possible to process an image of a wood substrate that best represents a bare wooden substrate by superposition of a stain image layer on top of the substrate image, resulting in an image that looks like a colored transparent filter having been applied over the substrate image. Such processing often uses so-called RGBA algorithms. Here, R, G and B refer to digital color values for the red, green and blue channels of digital images. The A represents a transparency or opaqueness factor chosen to represent the stain. For every pixel in the resulting image, an RGBA algorithm mixes the R, G and B values of the substrate image with the R, G and B values of the stain image layer, where the mixing ratio depends on the value of the transparency/opaqueness factor A.

Although the exact details of the mixing algorithm vary for different RGBA algorithms, none of these algorithms are an accurate physical representation of how a transparent/translucent stain layer affects the color of wood.

Generated images of stained wood are often very inaccurate. Currently, customers often find it very difficult to select the right translucent wood stain color for their wood object. Also, images of stained wood on websites or on stain container labels can be inaccurate, and may make customers disappointed after applying the stain. Further, it is very time-consuming and labor intensive to generate images of stained wood for different wood-stain-thickness combinations. In the case where multiple different stains are applied on a wood substrate the inaccuracies of current stained wood images are even larger than for wood substrates with one or more layers of the same stain.

EP1859241 describes an apparatus and method for preparing a stain to match a target color of a selected substrate (e.g., wood species). The apparatus includes hardware and/or software to create or load spectral data (e.g., a digital image) of a target sample and to display images and/or process spectral data. The system facilitates the selection of a desired stain, and in preferred embodiments may also include hardware and/or software to dispense colorant agents and/or vehicles to create the desired stain.

SUMMARY OF THE INVENTION

An object of the invention is to overcome, at least partly, one of the shortcomings of current generation of images of stained wood, or at least to provide an improved method for generating a visualization of a stained wood substrate.

Thereto is provided a computer implemented method for generating a visualization of a stained wood substrate. The method aims to receive a digital image of the wood substrate to be stained and transform it into a generated image representative of the wood substrate after applying the stain. The method includes the computer receiving a digital image of the wood substrate to be stained. The image may be received from a database or from a user input. The range of colors that is present in the image is subdivided into a plurality of color bands. The color bands can be determined based on the range of colors in the image. It is also possible that predetermined color bands are used. The color bands can be defined by RGB (Red, Green, Blue) values. Preferably more than three color bands are used, such as 8, 12, 16, 20, 24, 31, 32, etc. The image of the wood substrate is subdivided into a plurality of sub-images by the computer. Each sub-image corresponds to the portion of the image having a color falling into a respective one of the color bands. Each sub-image can for instance correspond to the pixels of the image having an RGB color in a respective one of the color bands.

For each sub-image a reflectance curve is retrieved by the computer, e.g. from a database, representative for the wood substrate having the color in the color band corresponding to the sub-image. The reflectance curve can be representative for wood having the (average) color of the color band. The reflectance curve can e.g. be representative for the species of the wood substrate for the color corresponding to the sub-image.

For the stain the computer retrieves coloristic properties, which are the wavelength-dependent absorption and scattering values.

For each sub-image, the computer determines the reflectance curve representative for the stained wood based on the absorption and scattering values for the stain and the reflectance curve for the wood substrate for that sub-image for a given stain layer thickness. The given layer thickness can e.g. be a freely chosen thickness, it can be a measured or estimated value, or a layer thickness can be chosen from one or more predetermined thicknesses, such as predetermined thicknesses corresponding to the application of one or more layers of the stain.

A reflectance curve for a sub-image typically includes reflectance values for large part of, or the entire, visible spectrum. Hence, although each sub-image relates to pixels having a color within a certain color band, for each sub-image reflectance information is used of a wider color spectrum than only the color band itself. Preferably, for each sub-image reflectance information is used for the entire visible spectrum. By using for each sub-image a reflectance curve, rather than color codes such as RGB values commonly used for digital images, a much more accurate prediction of the visual impression of the stained wood can be determined.

Each sub-image relates to a color band. Hence, each sub-image can contain pixels having a color varying within said color band. Optionally, per color band, one and the same reflectance curve is used for each pixel within that color band. The reflectance curve for the sub-image, can e.g. be the reflectance curve associated with the average color, or center color, of the color band.

The reflectance curve representative for the stained wood can be determined using the non-hiding Kubelka-Munk model using the absorption K and scattering S values (P. Kubelka and F. Munk, "An article on optics of paint layers," Zeitschrift für Technische Physik, vol. 12, no. 593-601, 1931). For each pixel of each sub-image the computer determines a color based on the reflectance curve representative for the stained wood, resulting in a generated digital image representative of the wood substrate after applying the stain.

It has been found that the color of stained wood critically depends on details of the reflectance of the wood substrate over a broad color spectrum. Therefore, preferably the reflectance of the wood is used for many more wavelength channels than the three channels (Red, Green and Blue) that are accounted for in RGBA algorithms.

Further, the RGBA method assumes that based on reflectance values for bare wood and pure stain, it is possible to predict the reflectance value of the stained wood in a wavelength band by using only one parameter, which is the transparency/opaqueness parameter A. However, optical analysis of stain systems has shown that an accurate prediction of the reflectance values for the stained wood requires at least two parameters, namely absorption K and scattering S. Apart from that, also the thickness of the stain layer needs to be known. Moreover, these parameters K and S may vary strongly with wavelength, whereas the RGBA method assumes that parameter A is independent of wavelength channel.

By dividing the image of the wood substrate to be stained into the sub-images by color band, determining the reflectance curve for each sub-image, determining the reflectance curve representative for the stained wood based on the absorption and scattering values for the stain and the reflectance curve for the wood substrate for that sub-image for a given stain layer thickness, and determining the color for each pixel of each sub-image, and thus for the entire image, on the basis of the reflectance curve representative for the stained wood, a resulting image of the stained wood substrate can be generated that better predicts the actual outcome of staining the wood substrate.

Herein, the term "stain" refers to a non-hiding transparent or semitransparent solution or dispersion of coloring matter (such as of one or more pigments, colorants, tinting agents, dyes and/or metal effect agents), plus various optional stain additives (e.g., fillers and extenders) in a vehicle (e.g., binder and thinner). Wood stains can e.g. be oil-based, alcohol based or water-based. The term "stain" also refers to "varnish stains" or "one step stain coatings," i.e., a product that can provide both a color (stain) to the wood and a finish coating in a single application. Non-limiting examples of finishes include varnishes, shellacs, polyurethanes, teak oil, linseed oil water-based dispersions and emulsions such as, for example, acrylic emulsions or polyurethane dispersions, and the like.

Optionally, the absorption and scattering values for the stain are determined by retrieving absorption and scattering values for every colorant in the stain and using the colorant concentrations in the stain determining the values of the absorption and scattering parameters of the stain mixture. For every colorant in a given stain recipe, the optical K and S values of the non-hiding Kubelka-Munk model can be retrieved, e.g. from a database, and using the colorant concentrations in the stain recipe the well-known Duncan rule produces the values of the K and S of the stain mixture (D. R. Duncan, "The colour of pigment mixtures," Proceedings of the Physical Society, vol. 52, no. 3, p. 390, 1940). This provides the advantage that absorption and scattering values for a stain can be determined efficiently, even when a particular stain has not been formulated before.

Optionally, the image of the wood substrate to be stained is received from a database. The database can include a plurality of images of wood substrates, e.g. of different wood species, and/or different samples of the same or similar wood species. Thus, a wood substrate can be selected that is representative for a wooden object to be stained. Alternatively, the image of the wood substrate to be stained is received from a user input. The user input can e.g. include a digital camera. The user input can also include a communications device such as a message receiver, e.g. an email receiver. The user input can also include a data transfer terminal, such as a USB terminal, NFC terminal, or the like. Hence, an image of the actual wooden object to be stained, or an object representative of the object to be stained, can be input to the computer.

Optionally, the method includes for each sub-image converting the color for each pixel from RGB values to tristimulus XYZ values or CIE-lab L*a*b* values. The X, Y, Z or L*, a*, b* values can be used to search in the database that contains reflectance curves representative for wood substrates.

Optionally, the method includes retrieving absorption and scattering values for a plurality of stains, such as from a database, and/or retrieving a plurality of images of to be stained wood substrates.

Optionally, the method includes inputting via a user interface data representative of one or more different to be stained wood substrates, data representative of absorption and scattering values for one or more, e.g. different, stains; and/or data representative of one or more layer thicknesses of the stain. The data representative of a to be stained wood substrate can e.g. include data relating to a wood species, data relating to a wood color, or the like. The data representative of a wood substrate can e.g. include a digital image of a wood substrate. The data representative of a wood substrate can e.g. include selection of an image of a wood substrate from a plurality of images. The selection can include multiple steps, e.g. to select general color, color highlights, grain pattern, streaks or the like. The data representative of absorption and scattering values for the stain can e.g. include a hue, saturation and lightness. The computer can determine actual absorption and scattering values for the stain most closely corresponding to the data representative of absorption and scattering values, e.g. the hue, saturation and lightness. The data representative of absorption and scattering values for the stain can e.g. include a color indication, such as a color name, e.g. "light oak", "cherry", "dark mahogany", "orange", "dark green", or the like. The computer can determine actual absorption and scattering values for the stain associated with the color indication, e.g. from a database. The data representative of absorption and scattering values for the stain can e.g. include selection of an image of a stained wood substrate from a plurality of images. The selection can include multiple steps, e.g. to hue, saturation and lightness, or the like. The data representative of a layer thickness of the stain can e.g. be a freely chosen layer thickness. The data representative of a layer thickness of the stain can also be chosen from one or more predetermined thicknesses, e.g. corresponding to the application of an increasing number of layers of the stain. The data representative of a layer thickness of the stain can also be included in the data representative of absorption and scattering values, e.g. in the lightness.

Optionally, the method includes providing one or more generated images of stained wood substrates for one or more different wood substrates and/or one or more different stains and/or one or more layer thicknesses of the stain. Hence, it is possible to assess the effect of different stains and/or different layer thicknesses on one or more woods. It is also possible to assess the effect of different wood substrates and/or different layer thicknesses for one or more stains. It is also possible to assess the effect of different wood substrates and/or different stains for one or more layer thicknesses.

It will be appreciated that it is possible that the layer thickness of the stain can be freely chosen. It is also possible that the layer thickness can be chosen from one or more predetermined thicknesses. The predetermined thicknesses can correspond to the application of an increasing number of layers of the stain. It is also possible that at least one image is generated of a stained wood substrate including at least a first layer of a first stain and a second layer of a different second stain. Hence, it is possible to assess the effect of a combination of different stains on one or more woods, for one or more layer thicknesses.

Optionally, the method includes the step of a user selecting a desired stain or stains on the basis of the one or more generated images of stained wood substrates. The user can select an image from one or more generated images of stained wood substrates, the selected image corresponding to the selected stain. The selected image can correspond to a desired combination of a first stain and a second stain.

Optionally, the method includes providing a plurality of generated images of stained wood substrates for a plurality of different stains, comparing the generated images of the stained wood substrates with a reference image, and selecting the stain resulting in the generated image of the stained wood substrate closest matching the reference image. The selecting can be done by the computer. Hence, selecting of the proper stain for the wood substrate at hand, for achieving the desired result corresponding to the reference image is greatly simplified.

Optionally, the method includes mixing a stain according to inputted absorption and scattering values for the stain. Alternatively, or additionally, the method can include mixing a stain according to the absorption and scattering values for the selected stain.

Optionally, the method including providing one or more generated images of stained wood substrates for one or more different wood substrates for one stain, and generating a label for a container for said stain using said generated images. Thus, the label of the container can provide a proper representation of the color of the included stain when applied to the one or more different wood substrates. Hence, the label can provide a true representation of the staining result to be achieved.

According to an aspect is provided a system comprising the computer arranged for performing the method as described hereinabove.

According to an aspect is provided a system for generating a visualization of a stained wood substrate. The system includes a receiver arranged for receiving an image of the wood substrate to be stained. The system includes a divider arranged for dividing the range of colors that is present in the image into a plurality of color bands; and subdividing the image in a plurality of sub-images, each sub-image corresponding to the portion of the image having a color falling in a respective one of the color bands. The system includes a first retriever arranged for, for each sub-image, retrieving, e.g. from a database, a reflectance curve representative for the wood substrate for the color corresponding to the sub-image. The system includes a second retriever for retrieving absorption and scattering values for the stain. The system includes a determining unit arranged for, for each sub-image, determining the reflectance curve representative for the stained wood based on the absorption and scattering values for the stain and the reflectance curve for the wood substrate for that sub-image and optionally stain layer thickness. The system includes a generator arranged for, for each pixel of each sub-image, determining a color based on the reflectance curve representative for the stained wood, resulting in a generated image representative of the wood substrate after applying the stain.

Optionally, the system includes a database, including one or more images of different wood substrates to be stained and/or absorption and scattering values for one or more different stains.

Optionally, the system includes a user interface arranged for receiving inputs relating to the to be stained wood substrate and/or to absorption and scattering values relating to the stain and/or to layer thickness of the stain, and/or for outputting one or more generated images of the stained wood substrate.

Optionally, the system includes a calculation unit arranged for retrieving absorption and scattering values for every colorant in the stain, and using the colorant concentrations in the stain determining the values of the absorption and scattering values of the stain mixture.

Optionally, the system is arranged for providing one or more generated images of stained wood substrates for one or more different wood substrates and/or one or more different stains and/or one or more layer thicknesses of the stain, e.g. on a display of the user interface. It is also possible that at least one image is generated of a stained wood substrate including at least a first layer of a first stain and a second layer of a different second stain. Thus, a user can select a desired stain or stains on the basis of the one or more generated images of stained wood substrates.

Optionally, the system is arranged for mixing a stain according to absorption and scattering values for the stain, e.g. inputted to the user interface. Alternatively, or additionally, the system can be arranged for mixing a stain according to the absorption and scattering values for the selected stain.

According to an aspect is provided a computer program product including computer implementable instructions which when implemented by a programmable computer cause the computer to:
  receive an image of the wood substrate to be stained;
  divide the range of colors that is present in the image into a plurality of color bands;

subdivide the image in a plurality of sub-images, each sub-image corresponding to the portion of the image having a color falling in a respective one of the color bands;

for each sub-image, retrieve a reflectance curve representative for the wood substrate for the color corresponding to the sub-image;

retrieve absorption and scattering values for the stain;

for each sub-image, determine the reflectance curve representative for the stained wood based on the absorption and scattering values for the stain and the reflectance curve for the wood substrate for that sub-image and optionally layer thickness; and for each pixel of each sub-image determine a color based on the reflectance curve representative for the stained wood, resulting in a generated image representative of the wood substrate after applying the stain.

The computer program product can be arranged as an app for execution on a mobile communications device such as a smart phone, tablet or laptop computer. The computer program product can be arranged for cooperating with databases, as described hereinabove, e.g. over telecommunications networks, such as the internet.

The computer program product can be arranged for creating images that can be used for labeling stain cans.

It will be appreciated that all features and options mentioned in view of the method apply equally to the systems and computer program product, and vice versa. It will also be clear that any one or more of the above aspects, features and options can be combined.

BRIEF DESCRIPTION OF THE DRAWINGS

Embodiments of the present invention will now be described in detail with reference to the accompanying drawings in which.

DETAILED DESCRIPTION

Stain products are (semi-) transparent and/or (semi-) translucent by definition. Therefore the appearance of the stain after application on wood is strongly dependent on the wood substrate. As a consequence, both the images on can labels in a paint shop and images used in e-Commerce websites can be a very poor indicator to the user for how a particular stain will look when applied on the wood of interest to the customer. Therefore, there is a need to accurately predict what a particular stain will look like on a particular wood substrate.

Common image processing tools, such as Photoshop and Paint.Net, offer functionality that may seem to be promising for producing images representing stained wood. With these tools, it is possible to process a substrate image that best represents a bare wooden substrate. These tools allow the superposition of an image layer on top of the substrate image, resulting in an image that looks like a colored transparent filter having been applied over the substrate image. It is important to note that these tools do not use optical models for creating the resulting image. Instead, they use so-called RGBA algorithms. Here, R, G and B refer to digital color values for the red, green and blue channels of digital images. The A represents a transparency or opaqueness factor. For every pixel in the resulting image, an RGBA algorithm mixes the R, G and B values of the substrate image with the R, G and B values of the image layer, where the mixing ratio depends on the value of the transparency/opaqueness factor A. Although the exact details of the mixing algorithm vary for different RGBA algorithms, none of these algorithms are an accurate physical representation of how a transparent/translucent stain layer affects the color of wood.

The color of stained wood critically depends on the reflectance of the wood substrate for many more wavelength channels than the three channels (Red, Green and Blue) that are accounted for in RGBA algorithms. The RGBA method assumes that based on reflectance values for bare wood and "pure stain", it is possible to predict the reflectance value of the stained wood in a wavelength band by using only one parameter, which is the transparency/opaqueness parameter A. However, optical analysis of stain systems shows that an accurate prediction of the reflectance values for the stained wood requires at least two parameters, namely absorption K and scattering S. Apart from that, also the thickness of the stain layer needs to be known. Moreover, these parameters K and S may vary strongly with wavelength, whereas the RGBA method assumes that parameter A is independent of wavelength channel. Finally, optical analysis of stain systems shows that the mathematical expressions to predict the reflectance and color of the stained wood are mathematically much more complicated than the often linearized approaches used in RGBA methods.

Figure 1:
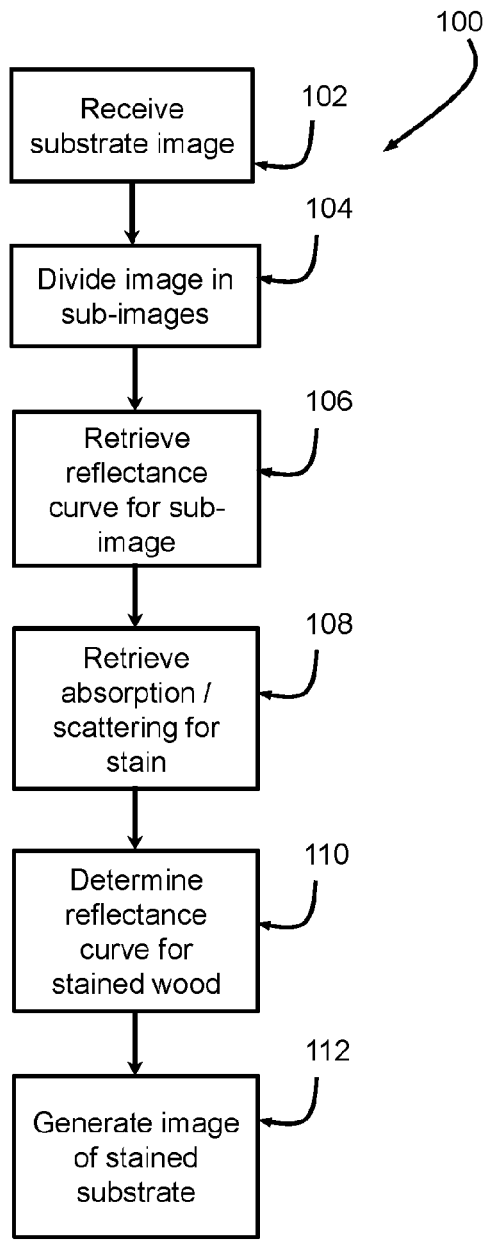
FIG. 1 shows a schematic flow chart of a method.
Figure 2:
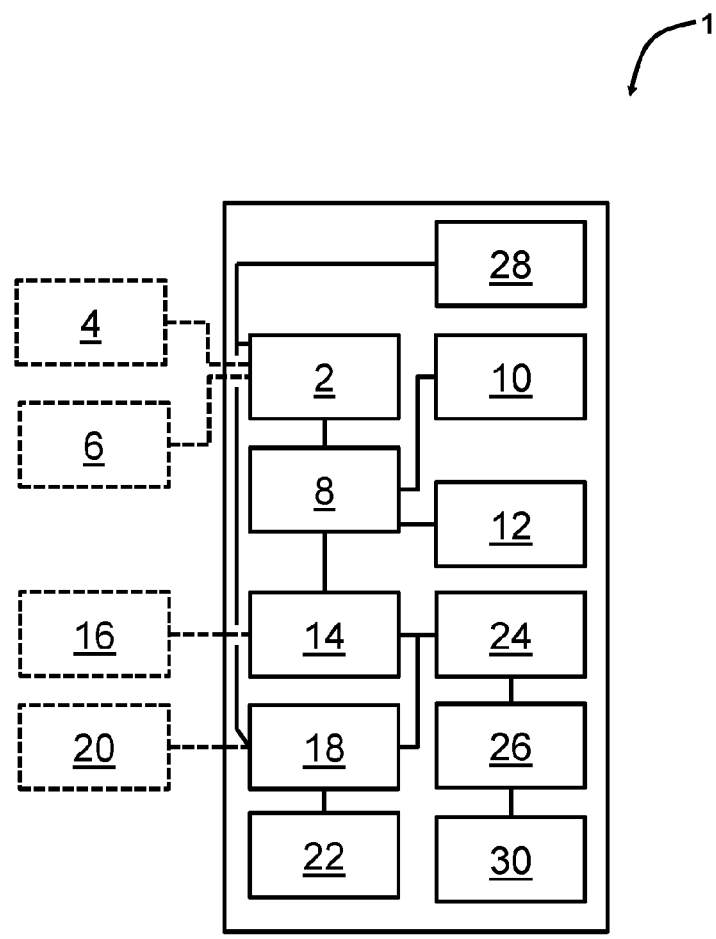
FIG. 2 shows a schematic representation of a system.
Figure 3:
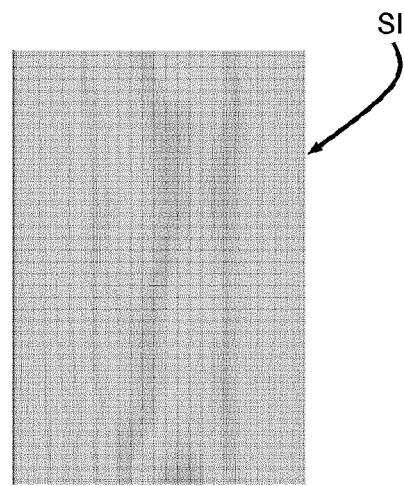
FIG. 3 shows an exemplary substrate image.

FIG. 1 shows an exemplary flow chart of a method 100 to generate more accurate visualization of stained wood substrates. FIG. 2 shows a schematic representation of an exemplary system 1 for performing the method 100. In step 102 the receiver 2 receives one or more substrate images that represent the wood substrate to be stained. FIG. 3 shows an example of a substrate image SI. The receiver 2 can receive the substrate image from a database 4 including a plurality of images of to be stained wood substrates. The receiver 2 can also receive the substrate image from another image source 6, such as a digital camera, a communications unit such as an email receiver, or the like.

Figure 4:
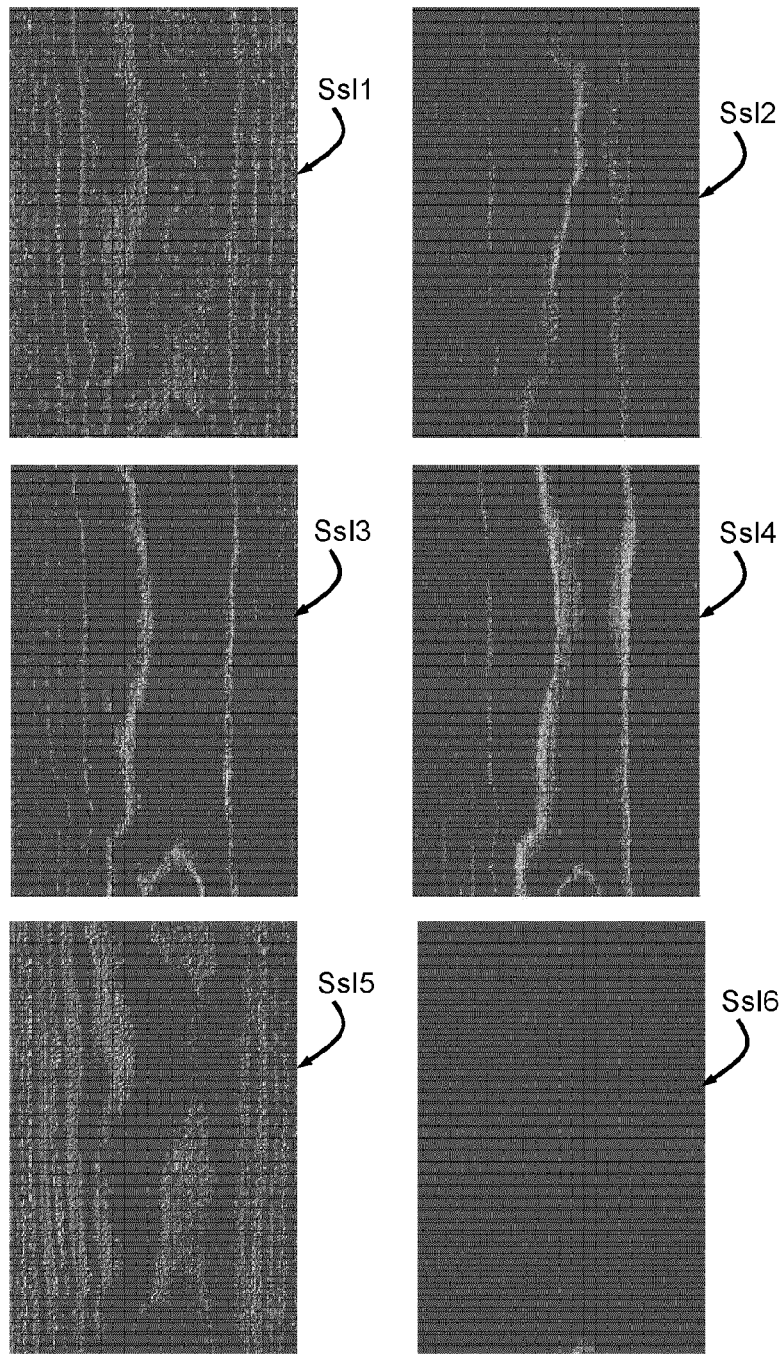
FIG. 4 shows examples of sub-images.

In step 104 a divider 8 subdivides the substrate image into a plurality of sub-images. Thereto, the pixels of the substrate image are clustered into N separate sub-images. In this example N=16, but other numbers of sub-images are conceivable. The range of colors that are present in the substrate image is divided into N color bands. The color bands can be predetermined color bands stored in a memory 10. In this example, the total range of colors actually present in the substrate image is divided into N color bands, here of equal color range width Each sub-image represents those areas in the substrate image that share the same substrate color, within a particular threshold. FIG. 4 shows six exemplary substrate sub-images SsI1, SsI2, SsI3, SsI4, SsI5, SsI6 corresponding to the substrate image SI of FIG. 3. The complete substrate image can be retrieved by recombining the N sub-images. Here, each sub-image represents those parts of the substrate image that share the same color (within the threshold), as represented by digital values for the Red (R), Green (G) and Blue (B) channel.

In this example, these R, G and B values are converted into colorimetric tristimulus values X, Y and Z by a converter 12. By using standard colorimetric equations, colorimetric tristimulus values X, Y and Z may be converted into colorimetric CIE-Lab coordinates L*, a* and b* by the converter 12. The R, G, B values, X, Y, Z values or L*, a*, b* values are used in step 106 by a retriever 14 to search in a database 16 that contains reflectance curves representative for wood. In this way, a reflectance curve is identified for the color corresponding to each sub-image.

In step 108 a second retriever 18 retrieves wavelength dependent values for the absorption K and scattering S of the stain, e.g. from a database 20. It is possible that the second retriever 18 retrieves for every colorant in a given stain recipe, the optical K and S values of the non-hiding Kubelka-Munk model from the database 20, and using the colorant concentrations in the stain recipe calculates, using a calculator 22, the values of the K and S of the stain mixture using the well-known Duncan rule.

In step 110, then for a given stain layer thickness, and given the substrate reflectance curve identified for each sub-image in step 106, a determining unit 24 determines, using the well-known non-hiding Kubelka-Munk model, the reflectance curve predicted for the stained wood for all pixels of the sub-image. By recombining all pixels from all N sub-images, the colors of all pixels of the image can be calculated by a generator 26 in step 112. The generator can calculate R, G and B values for each pixel, based on the reflectance curve predicted for the stained wood for each pixel, e.g. using well-known methods such as the sRGB model (International Electrotechnical Commission, Technical Committee 100, Audio, video and multimedia systems and equipment, Project team 61966: Color Measurement and Management in Multimedia Systems and Equipment, Part 2.1: Default RGB colour space—sRGB", IEC 1998). This results in an image that predicts the color variation of the wood substrate after application of the stain. As the generated image is based on RGB values, display of the generated on a screen is facilitated.

The system 1 can include a user interface. The user interface can include an input 28 arranged for receiving inputs relating to the wood substrate to be stained and/or to absorption and scattering values relating to the stain and/or to a layer thickness of the stain. The input relating to the wood substrate to be stained can e.g. include data relating to a wood species, data relating to a wood color, or the like, e.g. a selection on a screen. The input relating to the wood substrate can e.g. include a digital image of a wood substrate. The input relating to the wood substrate to be stained can e.g. include selection of an image of a wood substrate from a plurality of images. The selection can include multiple steps, e.g. to select general color, color highlights, grain pattern, streaks or the like. The input relating to absorption and scattering values for the stain can e.g. include inputs for a hue, saturation and lightness. The second retriever 18 can determine actual absorption and scattering values for the stain most closely corresponding to the inputs. The inputs relating to the absorption and scattering values for the stain can e.g. include a color indication, such as a color name, e.g. "light oak", "cherry", "dark mahogany", "orange", "dark green", or the like. The second retriever 18 can determine actual absorption and scattering values for the stain associated with the color indication, e.g. from a database. The inputs relating to the absorption and scattering values for the stain can e.g. include selection of an image of a stained wood substrate from a plurality of images. The selection can include multiple steps, e.g. to hue, saturation and lightness, or the like. The input relating to the layer thickness of the stain can e.g. be a freely chosen layer thickness. The input relating to the layer thickness of the stain can also be chosen from one or more predetermined thicknesses, e.g. corresponding to the application of an increasing number of layers of the stain. The data representative of a layer thickness of the stain can also be included in the data representative of absorption and scattering values, e.g. in the lightness. The inputs can also relate to a first layer of a first stain and a second layer of a different second stain, or even more layers of different stains.

The user interface can include an output 30 arranged for outputting one or more generated images of the stained wood substrate. The input 28 can include selectors for selecting a to be stained wood substrate image, for selecting a stain color, and for selecting a layer thickness. The input 28 can be arranged for receiving a reference image for matching the stain color thereto. The output 30 can include a display.

Figure 5:
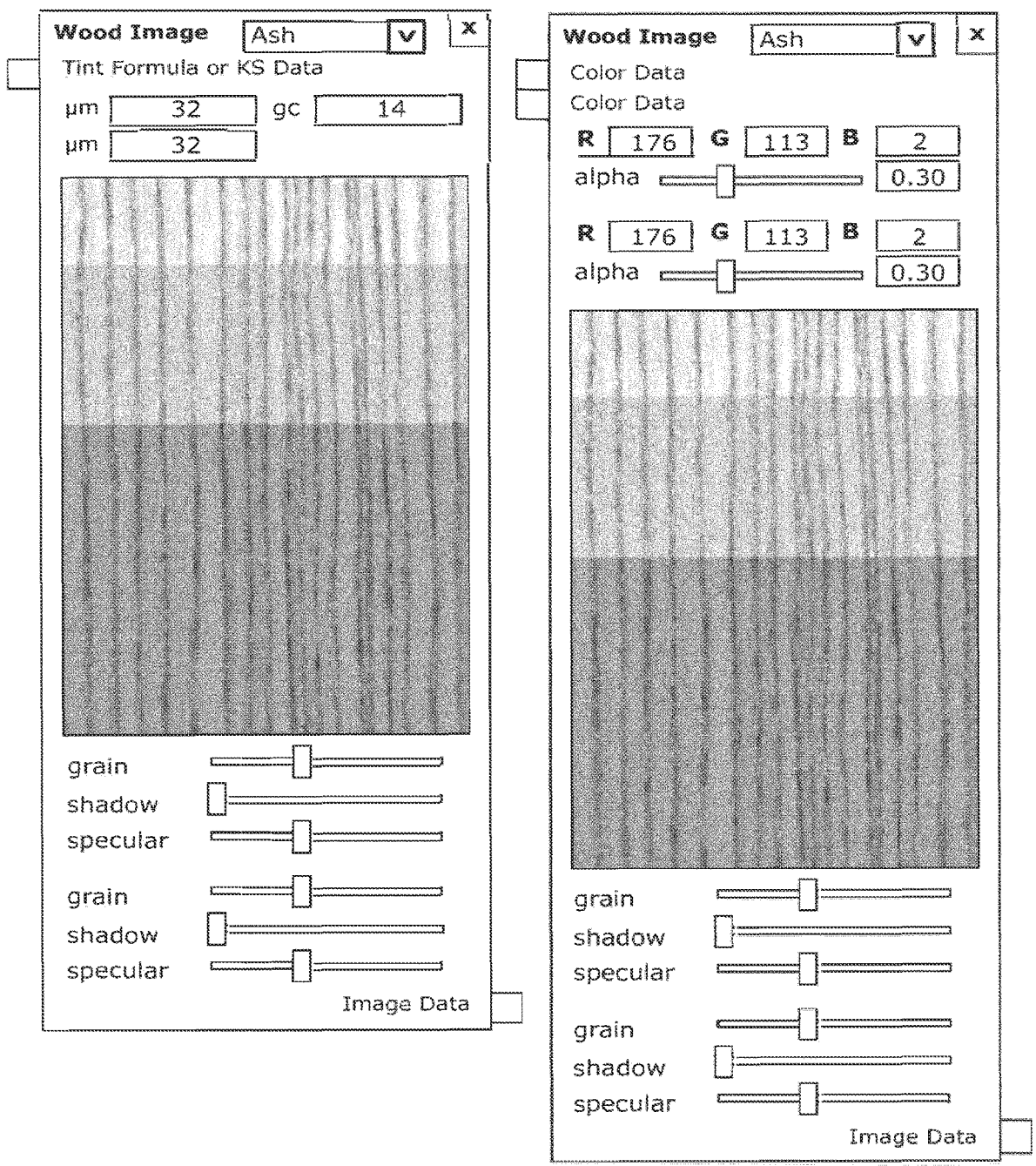
FIG. 5 shows a comparison of the present method and the RGBA method.
Figure 6:
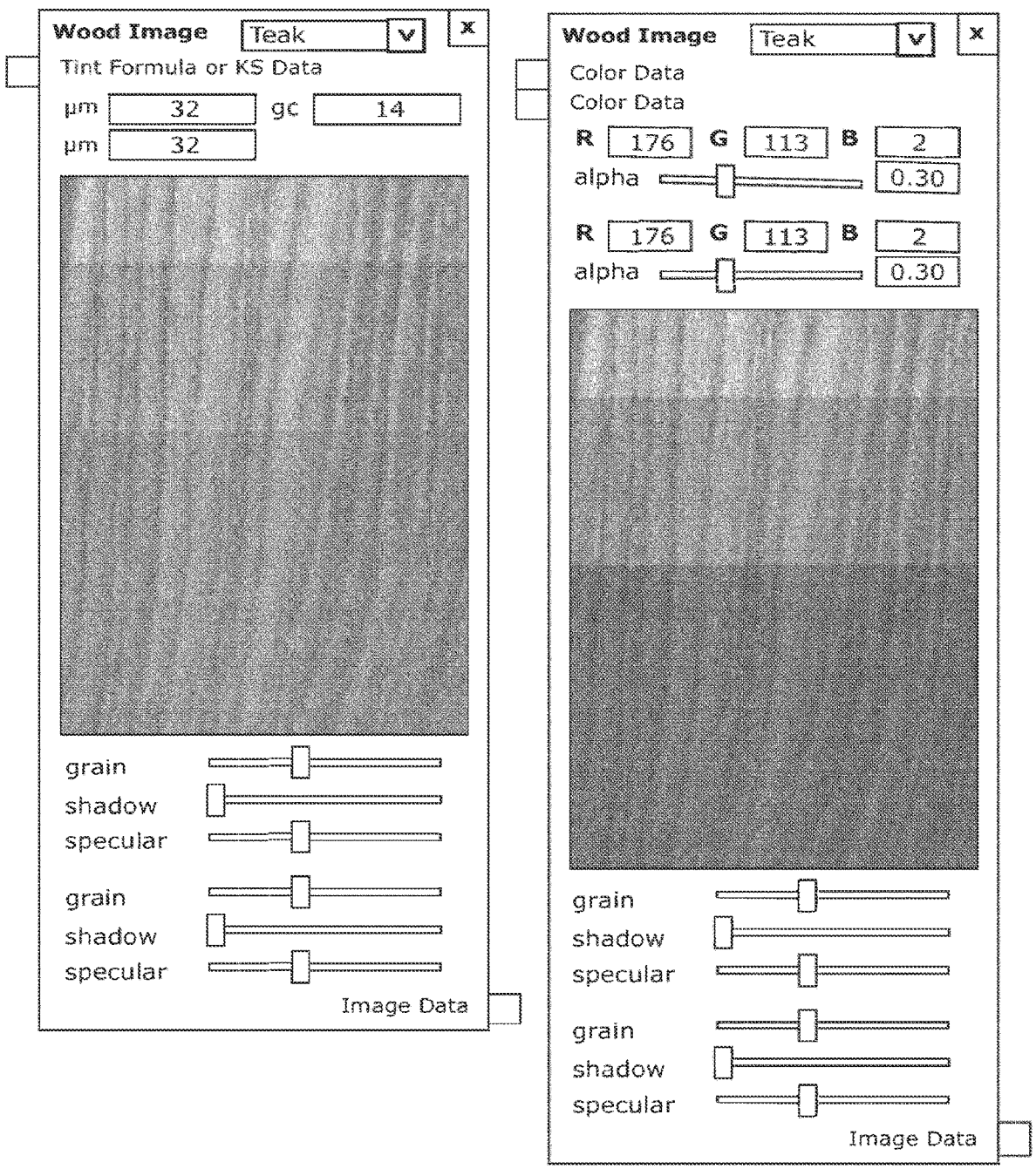
FIG. 6 shows a comparison of the present method and the RGBA method.

The method 100 described above generates more accurate images of wood stains than the RGBA method. The method allows generating accurate images also for any wood sample the customer may bring to the paint shop. This is illustrated in FIGS. 5 and 6. In FIGS. 5 and 6, the left image is based on the method 100 described above, whereas the right image is based on the RGBA method. In FIG. 5, the substrate image is of a piece of ash. It can be noted that the images calculated for the case that a particular stain is applied on this substrate, with calculations according to the present method 100 and the RGBA method, are very similar. This shows that both calculation methods for visualization are probably able to produce a good image for the given wood-stain combination. FIG. 6 shows what happens when the same methods are applied when trying to visualize the appearance of the same stain layer to a different type of wood. In FIG. 6, the substrate image is of a piece of teak. Now, the two methods do not produce similar images. It turns out that the present method 100 produces images that much better represent the look of the actual stain applied to the wood. This is not surprising, since the present method 100 is based on a more accurate physical model.

The system 1 can be a computer system, such as a point-of-sale computer system. The system 1 can be a mobile computing system, such as a smart phone, tablet, laptop computer or the like. The system can also be provided by a computer program product, such as an app, loaded and executed on a general purpose computer or mobile computing system.

The system can include hardware components arranged for mixing a stain according to absorption and scattering values for the stain, e.g. inputted to the user interface. Alternatively, or additionally, the system can be arranged for mixing a stain according to the absorption and scattering values for the selected stain

EXAMPLE

Substrate images were generated that represent to be stained wood substrates for three different wood types: Ash, Oak, Teak. The three wood samples were digitally photographed in a DigiEye light booth to ensure lighting with a CIE Standard Illuminant D65 spectrum. A calibration card with test colors (for example, the ColorChecker card from X-Rite) can be used when taking the photographs. Instead of using a D65 light booth, a flatbed scanner may be used for which a colorimetric characterization has been conducted. Another alternative is to use a multispectral or hyperspectral camera, which directly produces reflectance curves of the wood substrates.

In each substrate image, the colors that appear in the image were clustered into N separate sub-images. In this example N=16. Each sub-image represents those areas in the substrate image that share the same substrate color, here are within the same band. For this clustering step many different techniques are available. One example is K-Means clustering. Each sub-image represents those parts of the substrate image that share the same color, as represented by digital values for Red, Green and Blue channel. These R, G and B values are converted into colorimetric tristimulus values X, Y and Z.

In the example, this conversion from RGB to XYZ was relatively straightforward because the substrate images were taken with D65 spectrum. This leaves only one variable, which is light intensity. This variable may be estimated by including a test chart with calibration colors in the photographs. Mathematical details on the conversion from RGB to XYZ are common knowledge to person of ordinary skill in the art, and not repeated here for conciseness.

By using standard colorimetric equations, colorimetric tristimulus values X, Y and Z may be converted into colorimetric CIE-Lab coordinates L*, a* and b*. The X, Y, Z or L*, a*, b* values are used to search in a database that contains reflectance curves representative for wood. In this way, a reflectance curve is identified for the color corresponding to each sub-image. Mathematical details on the conversion from XYZ to Lab are common knowledge to person of ordinary skill in the art, and not repeated here for conciseness.

In this example, the database with reflectance curves and L*, a*, b* (or X, Y, Z) values characteristic for parts of bare wood was created by doing many reflectance measurements on different wood samples, and on different parts of these wood samples. Also, different aperture sizes were used in order to best represent all colors in wood substrates. The reflectance measurements were done with a diffuse d/8 spectrophotometer, Datacolor DC800, Specular Component Excluded. The method can also be applied using other types of spectrophotometers.

For every colorant in a given stain recipe, values of the optical K and S parameters of the non-hiding Kubelka-Munk model are retrieved from a database, and using the colorant concentrations in the stain recipe the well-known Duncan rule produces the values of the K and S of the stain mixture. For any given stain layer thickness, and given the substrate reflectance curve identified for each sub-image, the well-known non-hiding Kubelka-Munk model then produces the reflectance curve predicted for the stained wood for all pixels of the sub-image.

Mathematical details on the calculation of K and S for the mixture, and on the calculation of the reflectance for the stained wood are common knowledge to person of ordinary skill in the art, and not repeated here for conciseness.

The K and S values of the stain may also be determined in a different way. If the stain is applied on a standard black-white chart (for example, those from Leneta or from BYK-Gardner), then it is possible to determine the K and S value of the stain.

By recombining all pixels from all N sub-images, the colors of all pixels can be calculated. This results in an image that predicts the color variation of the stained wood.

Herein, the invention is described with reference to specific examples of embodiments of the invention. It will, however, be evident that various modifications and changes may be made therein, without departing from the essence of the invention. For the purpose of clarity and a concise description features are described herein as part of the same or separate embodiments, however, alternative embodiments having combinations of all or some of the features described in these separate embodiments are also envisaged.

In the examples, the color spectrum of the image is divided in a plurality of color bands. The image of the wood substrate is divided into a plurality of sub-images, wherein each sub-image corresponds to the portion of the image having a color in a respective one of the color bands. It will be appreciated that it is possible that for some substrate images a certain sub-image may not contain any pixels.

In the examples a resulting image of the stained wood substrate is generated. It is possible that a plurality of resulting images is generated, e.g. for a plurality of different wood substrates, for a plurality of different stains, and/or for a plurality of different stain layer thicknesses. It is also possible that a resulting image of the stained wood substrate is generated for a first layer of a first stain and a second layer of a different second stain, or more layers.

It is possible that for a certain stain one or more resulting images is generated for that stain applied to one or more wood substrates in one or more layer thicknesses. Such resulting images can be used on a label for a container for said stain. Hence, a good indication of the color of the stain once applied to a certain wood substrate and/or in a certain layer thickness is provided.

The databases 4, 16 and 20 can be integral part of the computer. The databases can also be remote databases, accessible by the computer, e.g. via a communications network such as the internet.

The method allows generating accurate images for any stain recipe that may result from a color matching process.

The method may account for different types of lighting. For example, it may account for the lighting in the paint shop.

The method gives the user better control of the possibilities of a particular stain recipe, by predicting how the stained wood will look after applying various layers of that stain.

However, other modifications, variations, and alternatives are also possible. The specifications, drawings and examples are, accordingly, to be regarded in an illustrative sense rather than in a restrictive sense.

For the purpose of clarity and a concise description features are described herein as part of the same or separate embodiments, however, it will be appreciated that the scope of the invention may include embodiments having combinations of all or some of the features described.

In the claims, any reference sign placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A computer implemented method for generating a visualization of a stained wood substrate, said method comprising the steps:
 a) receiving, with a receiver, an image of a wood substrate, which wood substrate is to be stained;
 b) dividing, with a divider, the range of colors that is present in the image into a plurality of color bands;
 c) subdividing, with the divider, the image into a plurality of sub-images, each sub-image corresponding to the portion of the image having a color falling in a respective one of the color bands;

d) for each sub-image, retrieving, with a first retriever, a reflectance curve representative for the wood substrate for the color corresponding to the sub-image;

e) retrieving, with a second retriever, absorption and scattering values for the stain;

f) for each sub-image, determining, with a determining unit, the reflectance curve representative for the stained wood based on the absorption and scattering values for the stain and the reflectance curve for the wood substrate for that sub-image; and g) for each pixel of each sub-image, determining, with a generator, a color based on the reflectance curve representative for the stained wood, resulting in a generated image representative of the wood substrate after applying the stain.

2. The method of claim 1, wherein absorption and scattering values for the stain are determined by:

retrieving absorption and scattering values for every colorant in the stain; and using the colorant concentrations in the stain, determining the values of the absorption and scattering values of the stain mixture.

3. The method of claim 1, wherein the image of the wood substrate to be stained is received from a database or from a user input.

4. The method of claim 1, further including retrieving absorption and scattering values for a plurality of stains, such as from a database, and/or retrieving a plurality of images of to be stained wood substrates.

5. The method of claim 1, further including inputting via a user interface:

data representative of one or more different to be stained wood substrates;

data representative of absorption and scattering values for one or more stains; and/or data representative of one or more layer thicknesses of the stain.

6. The method of claim 4, further including providing one or more generated images of stained wood substrates for one or more different wood substrates and/or one or more different stains and/or one or more layer thicknesses of the stain.

7. The method of claim 6, further including providing at least one generated image of a stained wood substrate including at least a first layer of a first stain and a second layer of a different second stain.

8. The method of claim 6, further including the step of a user selecting a desired stain or stains on the basis of the one or more generated images of stained wood substrates.

9. The method of claim 6, further including:

providing a plurality of generated images of stained wood substrates for a plurality of different stains;

comparing the generated images of the stained wood substrates with a reference image; and selecting the stain resulting in the generated image of the stained wood substrate closest matching the reference image.

10. The method of claim 1, further including mixing a stain according to inputted absorption and scattering values for the stain or according to absorption and scattering values for the selected stain.

11. The method of claim 1, further including providing one or more generated images of stained wood substrates for one or more different wood substrates for one stain, and generating a label for a container for said stain using said generated images.

12. The method of claim 1, further including, for each sub-image, converting the color for each pixel from RGB to tristimulus XYZ or L*a*b*.

13. A system for generating a visualization of a stained wood substrate, said system comprising:

a) a receiver arranged for receiving an image of a wood substrate, which wood substrate is to be stained;

b) a divider arranged for dividing the range of colors that is present in the image into a plurality of color bands, and subdividing the image into a plurality of sub-images, each sub-image corresponding to the portion of the image having a color falling in a respective one of the color bands;

c) a first retriever arranged for, for each sub-image, retrieving a reflectance curve representative for the wood substrate for the color corresponding to the sub-image;

d) a second retriever for retrieving absorption and scattering values for the stain;

e) a determining unit arranged for, for each sub-image, determining the reflectance curve representative for the stained wood based on the absorption and scattering values for the stain and the reflectance curve for the wood substrate for that sub-image; and f) generator arranged for, for each pixel of each sub-image, determining a color based on the reflectance curve representative for the stained wood, resulting in a generated image representative of the wood substrate after applying the stain.

14. The system of claim 13, further comprising a database, which database comprises one or both of:

a) one or more images of different wood substrates to be stained; and b) absorption and scattering values for one or more different stains.

15. The system of claim 13, further including a user interface arranged for one or both of:

a) receiving inputs relating to one or more of: the wood substrate to be stained; absorption and scattering values relating to the stain; and layer thickness of the stain; and b) outputting one or more generated images of the stained wood substrate.

16. The system of claim 13, further including a calculation unit arranged for:

retrieving absorption and scattering values for every colorant in the stain; and using the colorant concentrations in the stain, determining the values of the absorption and scattering values of the stain mixture.

17. A computer program product arranged for cooperating with databases including computer implementable instructions which when implemented by a programmable computer cause the computer to:

a) receive, with a receiver, an image of a wood substrate to be stained;

b) divide, with a divider, the range of colors that is present in the image into a plurality of color bands;

c) subdivide, with the divider, the image in a plurality of sub-images, each sub-image corresponding to the portion of the image having a color falling in a respective one of the color bands;

d) for each sub-image, retrieve, with a first retriever, a reflectance curve representative for the wood substrate for the color corresponding to the sub-image;

e) retrieve, with a second retriever, absorption and scattering values for the stain;

f) for each sub-image, determine, with a determining unit, the reflectance curve representative for the stained wood based on the absorption and scattering values for the stain and the reflectance curve for the wood substrate for that sub-image; and
g) for each pixel of each sub-image, determine, with a generator, a color based on the reflectance curve representative for the stained wood, resulting in a generated image representative of the wood substrate after applying the stain.

* * * * *